United States Patent [19]

Hintz et al.

[11] Patent Number: 5,475,428
[45] Date of Patent: Dec. 12, 1995

[54] METHOD FOR PROCESSING COLOR IMAGE RECORDS SUBJECT TO MISREGISTRATION

[75] Inventors: Wayne W. Hintz, Bergen; Robert H. Hibbard, Fairport; Kenneth A. Parulski, Rochester, all of N.Y.

[73] Assignee: Eastman Kodak Company, Rochester, N.Y.

[21] Appl. No.: 118,897

[22] Filed: Sep. 9, 1993

[51] Int. Cl.$^6$ ................................................. H04N 9/093
[52] U.S. Cl. ........................ 348/263; 348/190; 348/745
[58] Field of Search .................................... 348/263, 270, 348/271, 277, 190, 745, 806; 358/10, 51, 532, 529, 520; 382/17, 41, 22; H04N 9/093

[56] References Cited

U.S. PATENT DOCUMENTS

| | | | |
|---|---|---|---|
| 4,699,125 | 10/1987 | Komatsu | 128/6 |
| 5,081,524 | 1/1992 | Tsuruoka et al. | 358/32 |
| 5,111,804 | 5/1992 | Funakoshi | 128/6 |
| 5,142,359 | 8/1992 | Yamamori | 358/98 |
| 5,153,717 | 10/1992 | Nitta | 358/98 |
| 5,164,824 | 11/1992 | Ieoka et al. | 358/98 |
| 5,251,271 | 10/1993 | Fling | 382/41 |
| 5,325,190 | 6/1994 | Nagasaki | 348/263 |

FOREIGN PATENT DOCUMENTS

| | | |
|---|---|---|
| 0427436 | 5/1991 | European Pat. Off. . |
| 58-9494 | 1/1983 | Japan . |

*Primary Examiner*—James J. Groody
*Assistant Examiner*—Sherrie Hsia
*Attorney, Agent, or Firm*—David M. Woods

[57] ABSTRACT

In an electronic camera that can be utilized with a color filter wheel accessory for obtaining a color image composed of a sequence of red, green, and blue records, slight movement of the camera body can produce misregistration in the color records. Such misregistration can be determined by dividing the color image into a plurality of subsections, and selecting the particular subsection that meets a predetermined criterion for color neutrality, and that contains monochrome edge information suitable for correlation. The color records are brought into registration by processing the edge information of the selected subsection to determine the misregistration between the color records, and by shifting the misregistered records first by integer, and then by fractional pixel shift values.

15 Claims, 6 Drawing Sheets

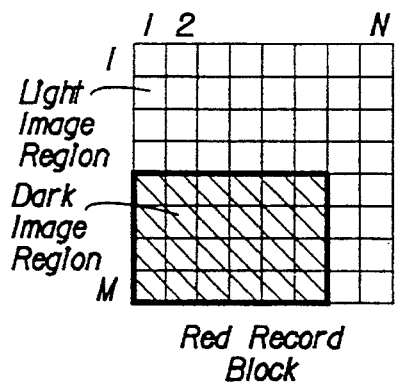 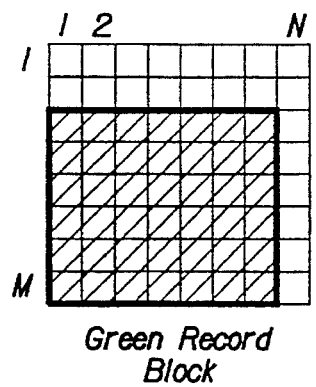 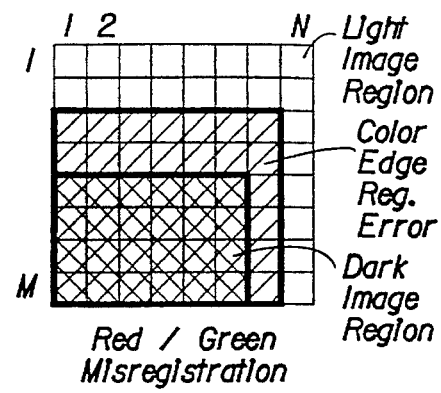
FIG. 4A     FIG. 4B     FIG. 4C
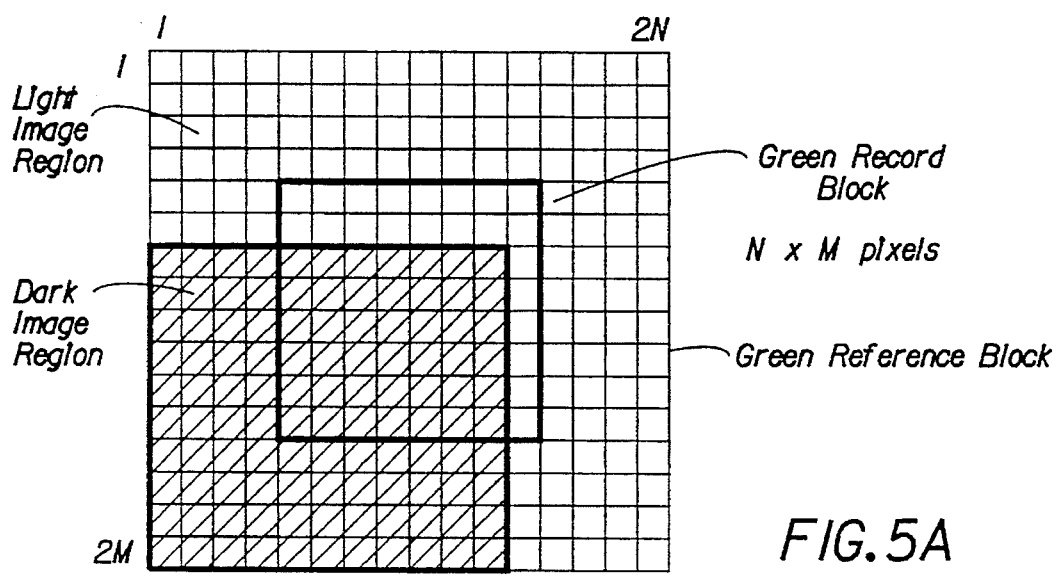
FIG. 5A
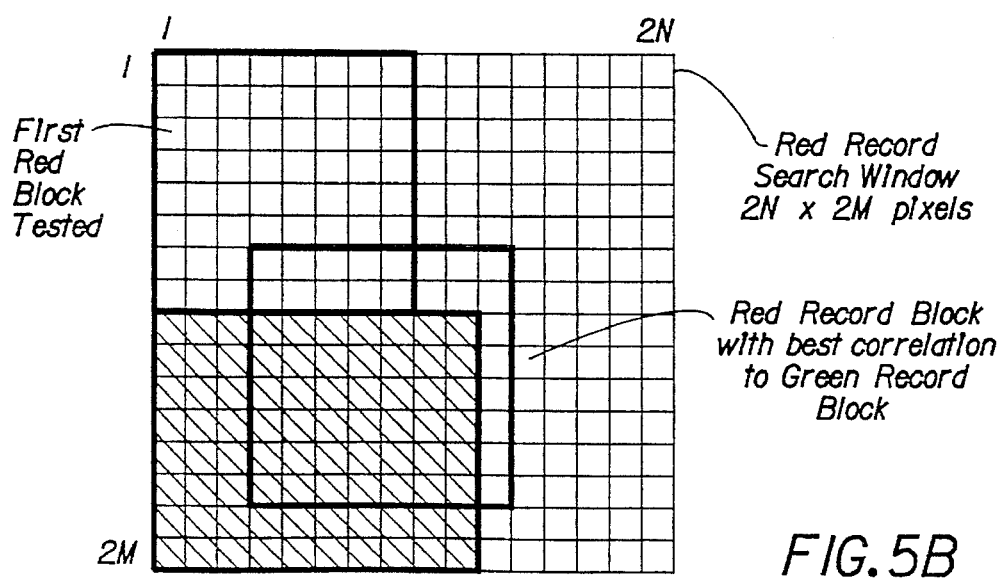
FIG. 5B

| | | upperVal1 | | |
| --- | --- | --- | --- | --- |
| | | upperVal | | |
| leftVal1 | leftVal | minVal | rightVal | rightVal1 |
| | | lowerVal | | |
| | | lowerVal1 | | |

Correlation Matrix (A) Shift up and right
(xShift ≥ 0, yShift ≥ 0)

(B) Shift down and right
(xShift ≥ 0, yShift ≤ 0)

(C) Shift up and left
(xShift ≤ 0, yShift ≥ 0)

(D) Shift down and left
(xShift ≤ 0, yShift ≤ 0)

METHOD FOR PROCESSING COLOR IMAGE RECORDS SUBJECT TO MISREGISTRATION

FIELD OF THE INVENTION

This invention pertains to the field of image processing, and in particular to the processing of color images composed of separate color records.

BACKGROUND OF THE INVENTION

A color filter wheel rotating in front of a monochrome charge-coupled device (CCD) sensor can be used to produce high resolution still images without the color artifacts normally associated with images produced through a color filter array mounted on a CCD sensor. Since this technique requires three sequential color records obtained by three separate exposures through the rotating color filter wheel, movement of the camera body enclosing the CCD sensor, or slight movement of the object being sensed, may cause the position of the CCD sensor relative to the object to be slightly different for one or more of the color records. In the prior art, the relative pixel shift between the records is determined, and then the pictures are either retaken until a suitable picture (without movement) is obtained, or the three misregistered records are manually aligned.

As an example of the former, U.S. Pat. No. 5,164,824 discloses an endoscope that generates color images from sequences of red, green, and blue illuminations. The endoscope also has an image freeze feature, but encounters difficulty when there is color misregistration due to movement between the red, green, or blue images. The solution is to monitor movement and to permit a freeze frame only when the movement is less than a predetermined level. In essence, therefore, actual misregistration is not corrected, but the image is retaken until the three records are relatively free of motion.

As an example of the technique of manual adjustment, several features of the Adobe Photoshop™ software may be used as tools to shift image planes relative to one another. The offset filter feature can be used to shift a plane by an integer number of pixels. The original color image is separated into its red, green, and blue component parts, and the proper plane is selected for shifting. The user must determine the amount of the shift via trial and error. After the shifting has been done, the three component planes are recombined to view the final result.

Fractional pixel shifts can also be obtained using the custom filter option. Again, the original color image is separated into red, green, and blue components. The user must determine the amount of the shifting to be done and calculate the filter coefficients necessary to perform that shift. The three planes are recombined to view the result. Both fractional and integer pixel shifts require user intervention. This process is manual and error-prone; most important, it does not determine the proper shift required, but simply performs the shift operation once the user decides what shift values to use.

In copending Ser. No. 712,865, filed Jun. 10, 1991 by the present assignee and entitled "Cross Correlation Image Sensor Alignment System", a correlation technique is used to register images from a 3-chip camera automatically, but it requires a special test target and does not compensate for any registration shifts from picture to picture. What is needed is a method for automatically registering images from a color sequential camera based on the picture image itself.

SUMMARY OF THE INVENTION

The need for automatically registering images is met, according to the invention, by a method of processing a color image composed of a plurality of color records subject to misregistration, based on locating a subsection of the image having appropriate characteristics and then doing the processing based on that subsection.

The invention comprises the steps of dividing the color image into a plurality of subsections, and selecting a particular subsection based on the color neutrality, as well as the edge information of the pixels within the particular subsection, whereby the misregistration between the color records can be determined by reference to the edge information in the selected subsection.

BRIEF DESCRIPTION OF THE DRAWINGS

The invention will be described in relation to the drawings, wherein

FIG. 4A–4C are diagrams showing an example of misregistration between the color records of a selected block;

FIGS. 5A–5B are diagrams showing an example of the correlation process;

DESCRIPTION OF THE PREFERRED EMBODIMENTS

Figure 1:
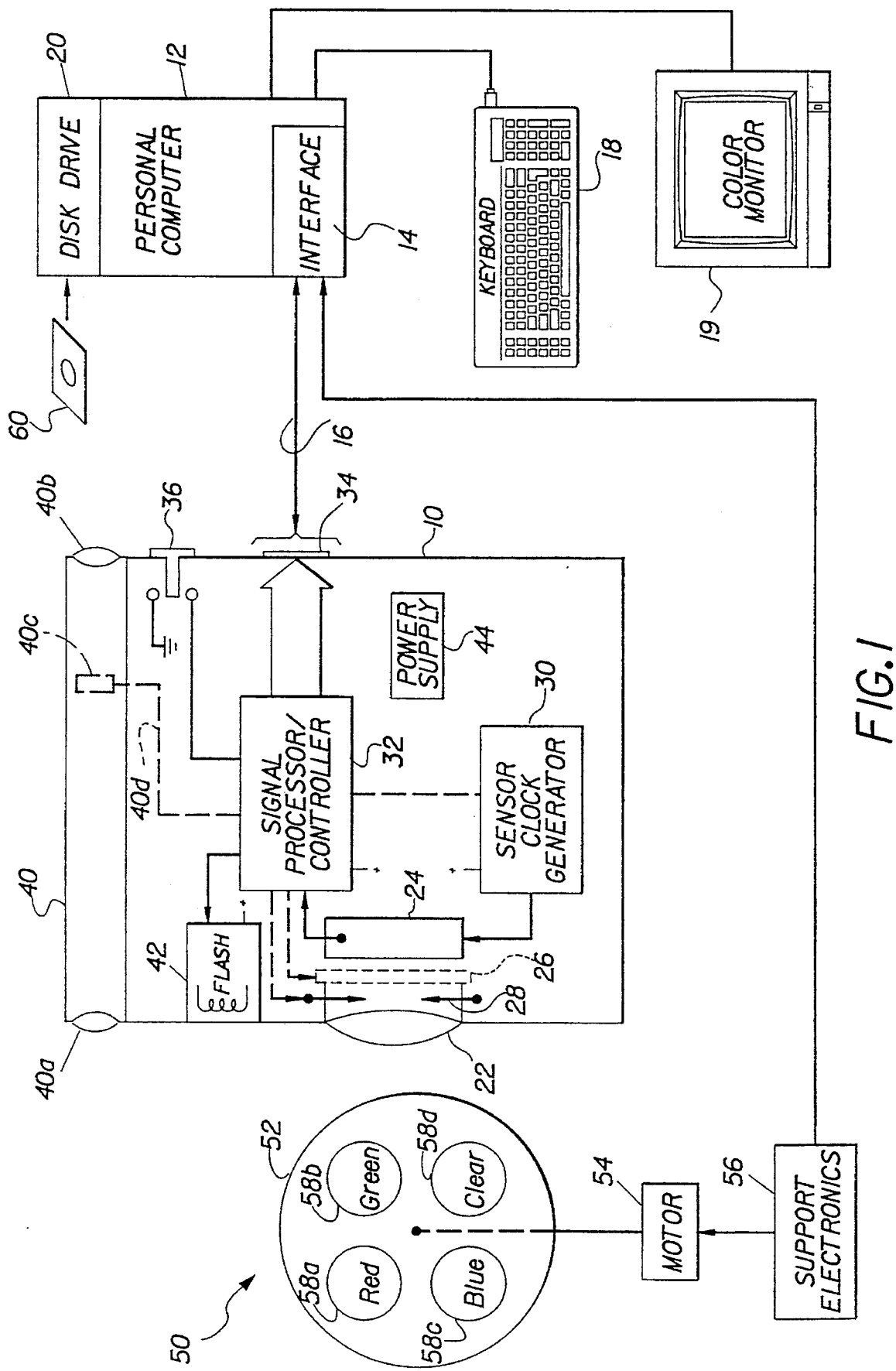
FIG. 1 is a block diagram of an electronic camera system that employs the processing method, according to the invention.

Referring first to FIG. 1, an electronic camera 10 is coupled to a personal computer 12 through a computer interface 14. The camera 10 is preferably remotely linked to the computer 12 with a cable 16, thus allowing a certain amount of mobility for the camera 10 independent of the computer 12. The interface 14 is a digital interface standard; for instance, if the Small Computer System Interface (SCSI) is used, the interface 14 is a SCSI interface board. The computer 12 additionally includes a conventional keyboard 18, a conventional color monitor 19, and a conventional disk drive 20, the latter being used to store pictures captured by the camera 10. Although not shown, the computer 12 includes the usual RAM storage for buffering incoming image data.

The camera 10 includes an optical system, represented by the lens 22 mounted for focusing image light from an object (not shown) to an image sensor 24. The optical system includes a shutter 26 and a diaphragm 28 for regulating the quantity of image light exposed upon the image sensor 24. The sensor 24 is biased and driven by a sensor clock generator 30, which provides the signals used to clock an output image signal from the sensor 24. The output image signal is applied to a signal processor/controller 32. The output of the signal processor 32 exits the camera through a connector 34, which accepts a suitable connector (not shown) on the cable 16. The camera 10 further includes a shutter button 36 for initiating an exposure sequence; a viewfinder 40, which may be an optical viewfinder (as represented by the lens 40a, 40b) or an electronic viewfinder (as represented by the LCD display 40c connected by broken line 40d to the signal processor/controller 32); an electronic flash 42, which may be detachable or integrally formed with the camera; and a power supply 44 for powering the various circuits and electrically-powered components in the camera 10. Instead of the optical arrangement shown in FIG. 1, the viewfinder 40 may alternatively be a through-the-lens viewfinder if a conventional flip-up mirror is inserted into the optical path between the lens 22 and the sensor 24 for diverting the image to the lens 40b.

The signal processor/controller 32 generates a digital color image signal for application through the connector 34 to the SCSI interface board 14. The input to the signal processor/controller 32 is a still image signal generated by the image sensor 24, which is, for example, a conventional full-frame sensor. Though not shown specifically, the signal processor/controller 32 would typically include an analog/digital (A/D) converter for converting the analog image signal to a digital image signal, and an interface converter for converting the output digital signals to the SCSI standard. The signals are then transmitted through the connector 34 to the SCSI interface board 14 in the computer 12.

In accordance with the invention, a color filter wheel accessory 50 is positioned in front of the camera 10 in line with the lens 22. While the accessory 50 may be mounted together with the camera 10 on, for example, a tripod, it is not intended to be integrally formed with the camera, but rather removable at the user's will. The accessory 50 comprises a color filter wheel 52 driven by a motor 54 from support electronics 56 connected to the computer 12. The filter includes red, green, and blue filters 58a, 58b, and 58c, that are sequentially rotated in front of the lens 22 to enable the camera 10 to produce a high resolution color image through sequential red, green, and blue exposures. The filter 52 also includes an open, or clear, position 58d for focusing; this is of particular use if the viewfinder 40 is a through-the-lens viewfinder. The accessory 50 may operate in a tethered or a stand-alone mode. In the tethered mode, the accessory 50 and the camera 10 are connected to the computer 12, which is running suitable image processing software, such as Adobe Photoshop™. Driver software 60 is provided to operate the camera and the accessory 50 in the selected image processing environment. The driver software 60 activates the computer 12 to cause the filter wheel 52 to move to the open position 58d to allow focusing (for through-the-lens viewing). When the operator activates a photograph from the shutter button 36 (or the keyboard 18), the driver 60 triggers three sequential pictures, rotating the filter 52 automatically. The driver software 60 also allows the operator to control the delay between the exposures to allow for recycling of the flash 42. In the stand-alone mode, the operator releases the shutter 36 on the camera 10 three times (once for each color record) for each color image. The filter wheel 52 is rotated by the motor 54 to the next filter position after each exposure.

Because the accessory 50 is separable from the camera 10, there may be slight misregistration of the color records due to movements of the accessory or the camera. (Ordinarily, the image is intended to be stationary over the three exposures; this method would correct slight movements of image, however.) After a sequence of exposures are taken for one picture, thereby obtaining pixels from three color records (ordinarily red, green, and blue records), the software in the driver 60 aligns the three color records to produce a registered color image. Correlation of the scene detail between the color records is used to determine the misregistration between the three color records. While a variety of correlation methods could be used, the sum of the absolute value of the differences was chosen because of its computational efficiency. To properly correlate the three color records, an area of the image that has a monochromatic edge is found. A monochromatic edge assures that an edge will exist in all three records and minimizes computations. The registration process begins by dividing the color image into a plurality of subsections. Then a particular subsection is selected that meets a predetermined criterion for color neutrality, and that also contains edge information that meets a predetermined criterion. Once the desired subsection has been located, it is used to correlate the three records and to determine the relative pixel shift between the records. Since the human visual system is most sensitive to information in the green color record, this record is used as a reference record and the red and blue records are shifted relative to it. Since the shifting typically requires a low pass filtering operation, this also maximizes image sharpness, since green does not need to be low pass filtered.

Figure 2:
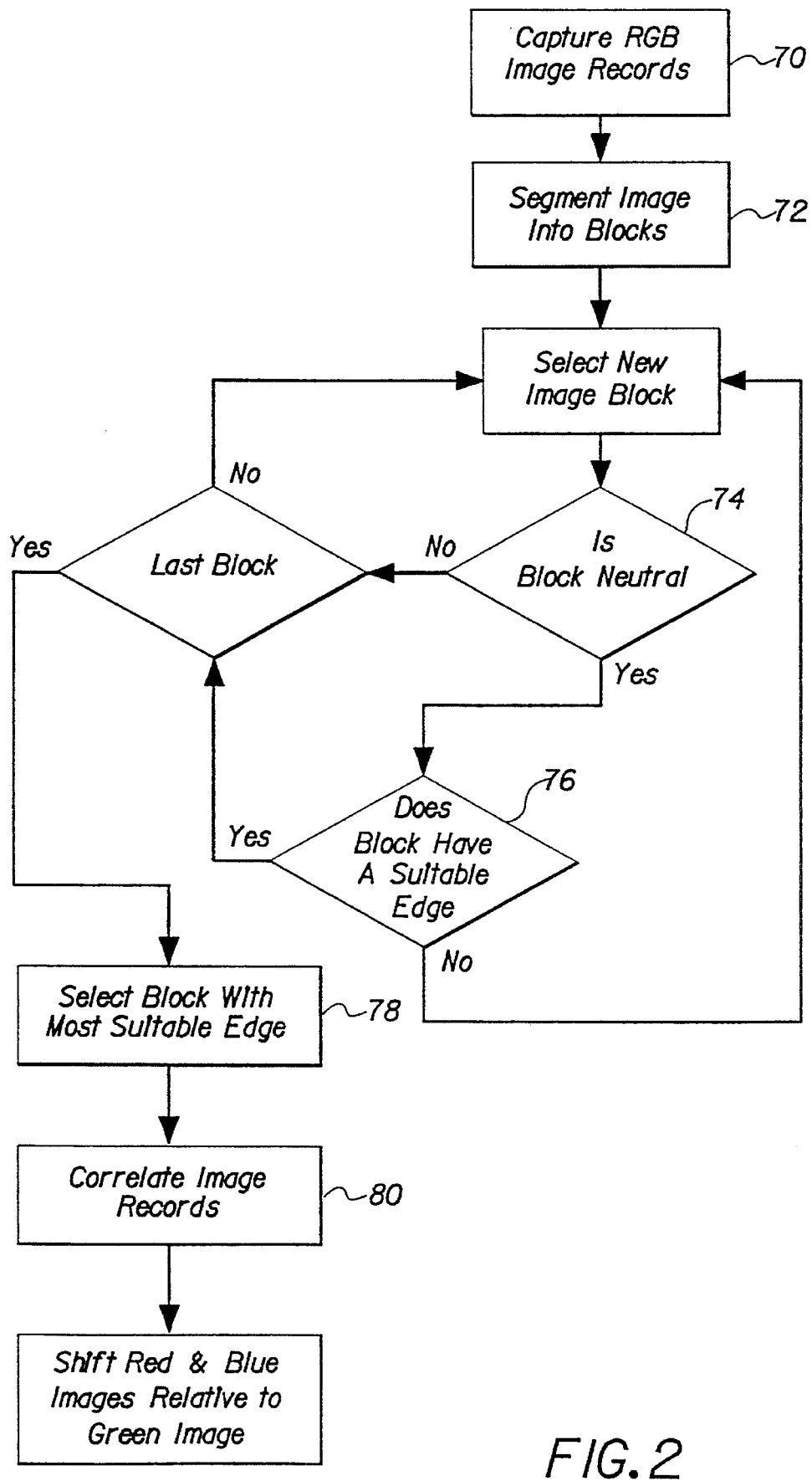
FIG. 2 is a flow chart showing the method, according to the invention.
Figure 3:
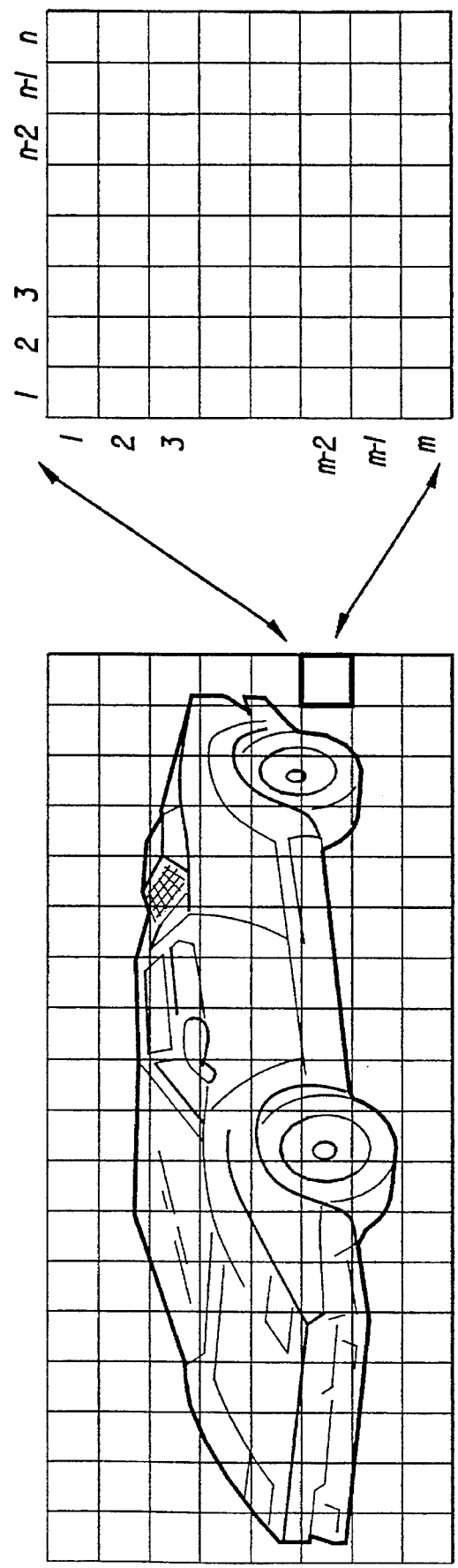
FIG. 3 is a diagram illustrating the segmentation of the image into blocks.

A flowchart of the method according to the invention is shown in FIG. 2. After the image records are captured (step 70), the red, green, and blue image records are segmented, as shown in step 72, into pixel blocks of n pixels by m lines, as illustrated in FIG. 3. In the preferred embodiment, the full image is 1024 lines×1536 pixels, and the block size is 16×16 pixels. Other image, and block, sizes are, of course, possible. Each block is first tested for color neutrality (step 74), according to the following criteria:

$$\sum_{y=0}^{n} \sum_{x=0}^{m} |R - G| < \text{Neutrality Threshold}$$

$$\sum_{y=0}^{n} \sum_{x=0}^{m} |B - G| < \text{Neutrality Threshold}$$

To test for red-green color neutrality, the sum of absolute values of the differences between pixels of the green block and pixels of the red block is calculated. To test for blue-green color neutrality, the sum of the absolute values of the differences between pixels of the green block and pixels of the blue block is calculated. For a pixel block to be considered color neutral, both the red-green sum and the blue-green sum must be less than a predetermined neutrality threshold.

Once a pixel block meets the color neutrality criteria, the block is tested (step 76) to see if a suitable edge for correlation is present. The horizontal and vertical gradients of the block are calculated to determine if an edge is present, according to the following criteria:

$$\sum_{y=0}^{n} \sum_{x=0}^{m} |G_{x,y} - G_{x-1,y}| = \text{Hor. Grad.}$$

$$\sum_{y=0}^{n} \sum_{x=0}^{m} |G_{x,y} - G_{x,y-1}| = \text{Vert. Grad.}$$

The green pixel block is used for this calculation. The horizontal gradient is calculated by summing the absolute value of the differences between all adjacent pixels within a row for each row within the block. The vertical gradient is calculated by summing the absolute value of the differences between all adjacent pixels within a column for each column within the block. A sharp edge will produce relatively high gradient calculations while a flat field will result in low values for the gradient calculations. A pixel block is considered to have a suitable edge for correlation if both the horizontal gradient and the vertical gradient are greater than a predetermined threshold. The block that has the greatest value for both the horizontal and vertical gradient is selected for correlation, as shown in step 78.

(The discrete cosine transform (DCT) could also have been used as a method of detecting edges within a given block. The DCT coefficients contain information about the frequency content of the image block. The coefficients could be used to locate a suitable edge of correlation since edges contain high frequency information. The gradient method was selected because of its computational efficiency.)

The next step in the process is to correlate the color records (step 80). The approach used is based on matching the color records of the selected block, which is m pixels by n lines, within a larger search window. This allows for comprehensive matching of overlapping positions of the blocks from the respective records. FIGS. 4A, 4B, and 4C show an example of the misregistration between the red and green records of the selected block, and the resulting color edge registration error that would appear as a red outline along the black and white edge in this example. The search window chosen for correlation, as shown in FIG. 5B, must be larger than the area of the red or blue record blocks by at least two times the anticipated horizontal and vertical pixel shift. Thus, the red and blue search windows have a size equal to 2M pixels×2N lines. The green record is again chosen as the reference and is shown in FIG. 5A over a larger reference window of 2M×2N pixels. As an example of the correlation process, consider the correlation of the red and green record blocks shown in FIGS. 5A and 5B, according to the following criteria:

Find pixel shift values (i,j) such that $$\sum_{j=-y_s}^{+y_s} \sum_{i=-x_s}^{+x_s} \sum_{x=0}^{m} \sum_{y=0}^{n} |G_{x,y} - R_{x-i,y-j}|$$

is a mininum, where $y_s$ and $x_s$ are the maximum expected misregistrations in the x and y directions.

(For the blue record, the correlation process is similar, but the correlation criteria is such that $$\sum_{j=-y_s}^{+y_s} \sum_{i=-x_s}^{+x_s} \sum_{x=0}^{m} \sum_{y=0}^{n} |G_{x,y} - B_{x-i,y-j}|$$

is a minimum)

The sum of the absolute values of the differences between the red pixels and the green pixels is calculated for the pixels within the thick square, the green reference block, at the center of FIG. 5A (green) and the thick square at the upper left of FIG. 5B (red). Next, the red block is shifted one column to the right relative to the starting position. Again for this position, the sum of the absolute value of the differences between the red pixels within the shifted block and the green pixels within the reference block is calculated. The red block is shifted horizontally column by column until the last column in the red record search window is reached by the right edge of the red block and the sum of the absolute value of the differences is calculated for each shift position.

The red block is then shifted vertically down one row relative to the green block and the process is repeated. The red block is shifted horizontally across this row and then vertically down one more row until all possible positions within the search window have been covered. The sum of the absolute value of the differences between the red block and the green block is calculated for all of these positions. The records are considered correlated at the location where the sum of the absolute value of the differences is a minimum value. This location is given by the second, more centrally located thick square in FIG. 5B. To remove the color misregistration, the entire red record must now by shifted by the amount required to reposition this thick square in FIG. 5A. This integer pixel shift is accomplished by shifting the red and blue pixel values to the proper memory locations.

A matrix of correlation values (sums of absolute values) is created from the process described above; that is, each sum for each position of the shifted red block becomes an entry in the matrix. This matrix is used to determine both the integer and fractional pixel shift required to align the planes. Given that exact correlation between the blocks means that the central value of the matrix is a minimum, any deviation therefrom can be translated into the necessary shift. Consequently, the integer shift is determined by counting the number of matrix locations away from the center of the matrix where the minimum value occurred. The integer shift values are calculated for both the horizontal and vertical direction.

Figures 6A, 6B:
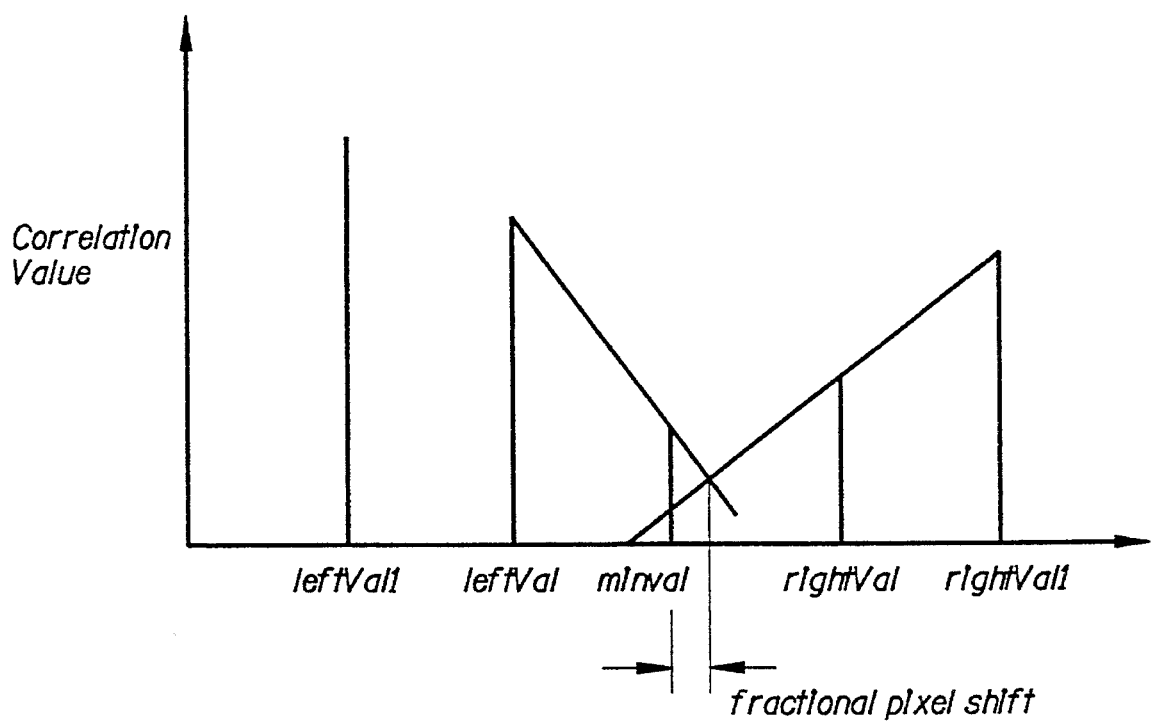
FIGS. 6A–6B are diagrams, respectively, of a portion of the correlation matrix and the calculation technique for fractional pixel shifts.
Figure 7:
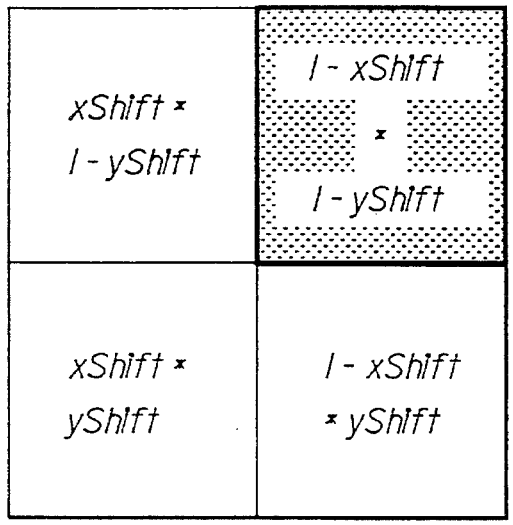
FIGS. 7A–7D are diagrams showing examples of bilinear interpolation to account for fractional pixel shifts.
Figure 7:
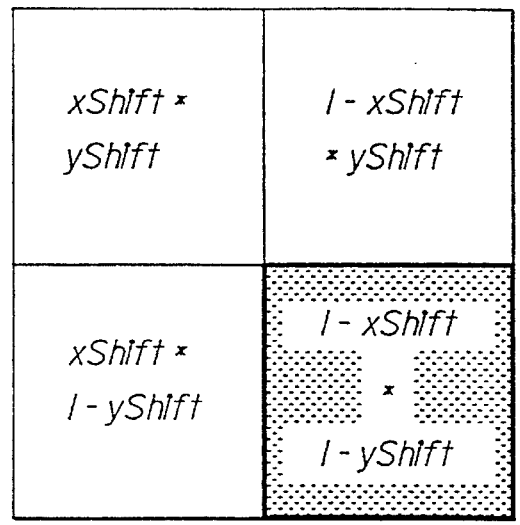
Figure 7:
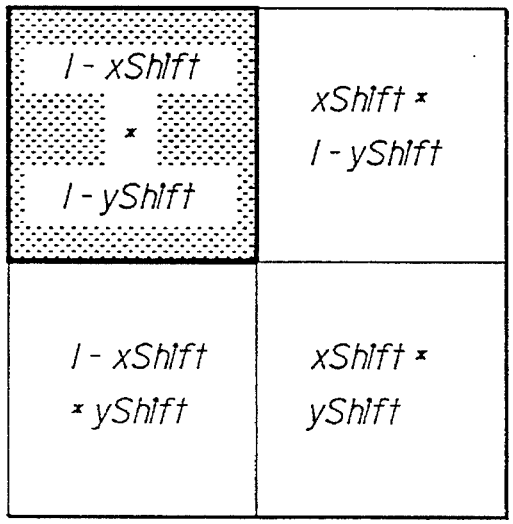
Figure 7:
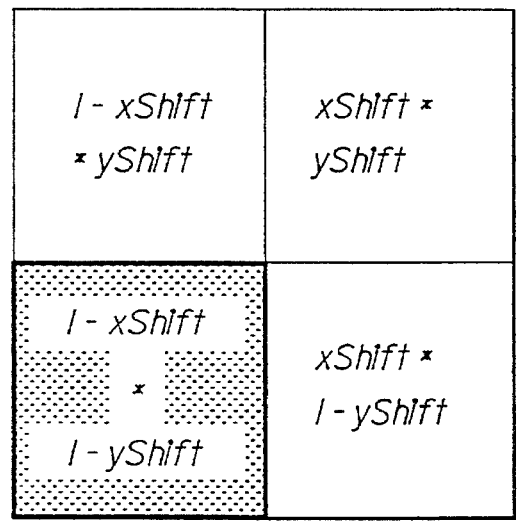

The horizontal fractional pixel shift is calculated by using the minimum value and the matrix values immediately to the right and left of the minimum value, along with a fourth point from the same row of the matrix, to form two straight lines as shown in FIGS. 6A and 6B. (Consequently, FIG. 6A shows a portion of the full matrix.) If rightVal is less than leftVal, then rightVal1 is selected as the fourth point. RightVal and rightVal1 are taken as two points on a straight line. MinVal and leftVal are also taken as two points on another straight line. The horizontal fractional pixel shift is the x value of the point where the two lines intersect. If rightVal is greater than leftVal, then rightVal and minVal form one line and leftVal and leftVal1 form the second line. The horizontal fractional pixel shift is therefore the x value of the point where the two lines intersect. The vertical fractional pixel shift is found by using the same technique, but with matrix values above and below the minimum value.

Once the horizontal and vertical fractional pixel shifts have been calculated, bilinear interpolation can be used to perform the fractional pixel shifts on the integer shift-corrected red and blue pixel data. Bilinear interpolation was chosen because of its computational efficiency. Refer to FIG. 7A–7D for the bilinear calculations involved in the various, possible fractional shifts according to the values of x shifts and y shifts shown in the Figure. In each case, the shaded squares represent the offset of the red (or blue) pixel from the reference green pixel. In each case, the shaded squares represent an interpolated location which will constitute the sum of the pixel values in the adjacent squares multiplied by their respective matrix coefficients plus the original pixel value in the shaded location multiplied by its matrix coefficient. This calculation has the effect of bringing the interpolated pixel into fractional coincidence with the green reference pixel. Other methods such as sinc function interpolation could be used to perform the fractional pixel shifts. Bilinear interpolation was chosen because of its computational efficiency.

The invention outlined in the flowchart of FIG. 2, and in the subsequent figures and description, is implemented by programming of the computer 12, illustratively in FIG. 1 through the use of driver software 60. The programming is conventional, and well within the capability of one of ordinary skill in the programming arts.

The invention has been described in detail with particular reference to the preferred embodiment thereof, but it will be understood that variations and modifications can be effected within the spirit and scope of the invention.

PARTS LIST

10 Electronic camera
12 Personal computer
14 SCSI interface board
16 Cable
18 Conventional keyboard
19 Conventional color monitor
20 Conventional disk drive
22 Lens
24 Image sensor
26 Shutter
28 Diaphragm
30 Sensor clock generator
32 Signal processor/controller
34 Connector
36 Shutter button
40 Viewfinder
40a Lens
40b Lens
40c LCD display
40d Broken line
42 Electronic flash
44 Power supply
50 Color filter wheel accessory
52 Color filter wheel
54 Motor
56 Support electronics
58a Red filter
58b Green filter
58c Blue filter
58d Open position for focusing
60 Driver software

What is claimed is:

1. A method for processing a color image composed of pixels from a plurality of color records subject to misregistration, said method comprising the steps of:

dividing the color image into a plurality of subsections; and selecting a particular subsection based on color neutrality and edge information of the pixels within the particular subsection, whereby the misregistration between the color records can be determined by reference to the edge information in the particular, selected subsection.

2. A method as claimed in claim 1 wherein the step of selecting a particular subsection based on the color neutrality comprises selecting a particular subsection that meets a predetermined criterion for the color neutrality.

3. A method as claimed in claim 2 wherein the criterion for the color neutrality is a threshold and the step of selecting involves comparing the sum of absolute values of differences between values of corresponding pixels in the color records to the threshold.

4. A method as claimed in claim 1 wherein the edge information comprises at least one of a horizontal and vertical gradient calculated between pixels in rows and columns in the selected subsection.

5. A method for processing a color image composed of pixels from a plurality of color records that are subject to misregistration, said method comprising the steps of:

dividing the color image into a plurality of blocks, each block composed of color blocks in the respective color records;

selecting a particular block, composed of corresponding color blocks, that meets a predetermined criterion for color neutrality, and that contains at least one of a horizontal gradient and a vertical gradient indicative of an edge suitable for correlation, said edge appearing as color edge components in each of the corresponding color blocks; and correcting the misregistration between the color records by correlating a location of the color edge components in each of the color records.

6. A method as claimed in claim 5 wherein the criterion for the color neutrality is a threshold and the step of selecting is based on comparing the sum of absolute values of differences between values of corresponding pixels, in the respective color blocks, to the threshold.

7. A method as claimed in claim 5 wherein the gradients indicative of an edge comprise the sums of absolute values of differences between all adjacent pixels within a row for each row, and within a column for each column, within the selected block.

8. A method as claimed in claim 5 wherein the step of correlating is based on using one of the color records as a spatially-fixed reference and the other color records in spatially-variable positions, and then calculating the sum of absolute values of differences between reference pixels from the spatially-fixed reference and the pixels in the other color records for each of the spatially-variable positions.

9. A method of processing a color image composed of pixels from a plurality of color records subject to misregistration, said method comprising the steps of:

dividing the color image into a plurality of image blocks, each image block composed of color blocks in the respective color records;

selecting a particular image block that passes a predetermined threshold for color neutrality, and that contains an edge that exceeds a predetermined gradient threshold;

determining the misregistration between the color records by correlating pixel values in the color records composing the particular image block selected in the preceding step; and correcting the misregistration by shifting at least one of the color records composing the color image.

10. A method as claimed in claim 9 wherein the step of selecting is based on comparing the sum of absolute values of differences between values of corresponding pixels in the color records to the threshold.

11. A method as claimed in claim 9 wherein the edge is characterized by a gradient comprised of sums of absolute values of differences between all adjacent pixels within a row for each row, and within a column for each column, within the selected block.

12. A method as claimed in claim 9 wherein the step of correlating is based on calculating the sum of absolute values of differences between the pixels within a color block of one of the records, used as a spatially-fixed reference, and the pixels within the corresponding color block of another of the records, as positioned in a plurality of spatially-variable positions that overlap the color block used as the spatially-fixed reference.

13. A method as claimed in claim 9 wherein the step of correcting comprises separate steps of correcting for integer misregistration and then for fractional misregistration.

14. A method for processing a color image composed of pixels from a plurality of color records subject to misregistration, said method comprising the steps of:

dividing each color record into a plurality of subsections;

automatically selecting a subsection of one record according to a selection criteria based at least in part on a color neutrality test;

performing a correlation operation relative to the selected subsection to determine the amount of shift in a second record needed to minimize registration error between the two records; and shifting the second record by said amount of shift.

15. A method for processing a color image composed of pixels from a plurality of color records subject to misregistration, said method comprising-the steps of:

dividing each color record into a plurality of subsections;

automatically selecting a subsection of one record according to a selection criteria based on at least one of a horizontal gradient and a vertical gradient test;

performing a correlation operation relative to the selected subsection to determine the amount of shift in a corresponding subsection of a second record needed to minimize registration error between the two subsections; and shifting all of the subsections of the second record by said amount of shift.

* * * * *